(12) United States Patent
Otaibi

(10) Patent No.: US 11,434,760 B2
(45) Date of Patent: Sep. 6, 2022

(54) REAL TIME GAS MEASUREMENT SUB

(71) Applicant: SAUDI ARABIAN OIL COMPANY, Dhahran (SA)

(72) Inventor: Mohammed M. Otaibi, Dammam (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 105 days.

(21) Appl. No.: 17/069,096

(22) Filed: Oct. 13, 2020

(65) Prior Publication Data
US 2022/0112804 A1 Apr. 14, 2022

(51) Int. Cl.
| | | |
|---|---|---|
| *E21B 49/08* | (2006.01) | |
| *E21B 21/08* | (2006.01) | |
| *E21B 21/10* | (2006.01) | |
| *E21B 33/06* | (2006.01) | |
| *E21B 47/12* | (2012.01) | |
| *G01N 27/12* | (2006.01) | |

(52) U.S. Cl.
CPC .......... *E21B 49/0875* (2020.05); *E21B 21/08* (2013.01); *E21B 21/10* (2013.01); *E21B 33/06* (2013.01); *E21B 47/12* (2013.01); *G01N 27/12* (2013.01); *E21B 2200/04* (2020.05)

(58) Field of Classification Search
CPC ...... E21B 49/0875; E21B 21/08; E21B 21/10; E21B 33/06; E21B 47/12; E21B 2200/04; G01N 27/12
See application file for complete search history.

(56) References Cited

U.S. PATENT DOCUMENTS

| | | | |
|---|---|---|---|
| 3,872,721 A | | 3/1975 | Ilfrey |
| 4,802,143 A | * | 1/1989 | Smith ..................... E21B 21/08 |
| | | | 73/152.28 |

(Continued)

FOREIGN PATENT DOCUMENTS

| | | |
|---|---|---|
| CN | 103291290 A | 9/2013 |
| CN | 108518201 A | 9/2018 |

OTHER PUBLICATIONS

Adabayo, Thomas A. et al., "Alteration of Oil-Based Drilling Mud Properties Due to Contact with CO2 Gas Kick During Drilling", ATE-10113042, Asian Transactions on Engineerting (ATE ISSN: 2221-4267), vol. 1, Issue 4, Sep. 2011, pp. 43-47 (5 pages).

Yanez, Miriam Garcia, "Glucose Meter Fundamentals and Design", Document No. AN4364, Freescale Semiconductor: Application Note, Freescale Semiconductor, Inc., Jan. 2013 (34 pages).

O'bryan, Patrick Leon, "Well Control Problems Associated with Gas Solubility in Oil-Based Drilling Fluids.", LSU Digital Commons: LSU Historical Dissertations and Theses, 4524, May 1988, URL: <https://digitalcommons.lsu.edu/gradschool_disstheses/4524> (150 pages).

(Continued)

*Primary Examiner* — D. Andrews
(74) *Attorney, Agent, or Firm* — Osha Bergman Watanabe & Burton LLP

(57) ABSTRACT

A system for detection of real time gas expansion within a wellbore using an oil based mud. The system includes one or more ball valve cartridges located in a drill string, where the one or more ball valves are arranged serially along a length in the drill string. Each of the one or more ball valve cartridges include a corresponding gas detection electrode. The system also includes a control system for receiving an output signal from the gas detection electrode. Each of the one or more ball valve cartridges is configured to have a higher pressure rating than a preceding ball valve cartridge, and the gas detection electrode is configured to react with a dissolved gas in the oil based mud, causing an oxidation reaction, and thereby generating the output signal.

9 Claims, 4 Drawing Sheets

(56) References Cited

U.S. PATENT DOCUMENTS

| | | | |
|---|---|---|---|
| 6,176,323 B1* | 1/2001 | Weirich | E21B 49/005 |
| | | | 175/40 |
| 2008/0123470 A1 | 5/2008 | Cooper et al. | |
| 2009/0014325 A1* | 1/2009 | Jones | E21B 49/10 |
| | | | 204/400 |
| 2009/0044617 A1* | 2/2009 | DiFoggio | E21B 49/081 |
| | | | 73/152.55 |
| 2012/0318527 A1 | 12/2012 | Erkol et al. | |
| 2014/0160891 A1 | 6/2014 | Russell | |
| 2015/0167430 A1 | 6/2015 | Purkis et al. | |
| 2016/0091389 A1 | 3/2016 | Zuo et al. | |
| 2016/0194955 A1 | 7/2016 | Delmar et al. | |
| 2016/0245041 A1 | 8/2016 | Deacon et al. | |
| 2016/0326833 A1 | 11/2016 | Luke | |
| 2017/0058634 A1 | 3/2017 | Roessler et al. | |
| 2017/0175487 A1 | 6/2017 | Marcin et al. | |

OTHER PUBLICATIONS

Ma, Z. et al., "Gas Kicks in Non-Aqueous Drilling Fluids: A Well Control Challenge", IADC/SPE-189606-MS; IADC/SPE Drilling Conference and Exhibition, Mar. 2018 (24 pages).

Thomas, David C. et al., "Gas Solubility in Oil-Based Drilling Fluids: Effects on Kick Detection", Journal of Petroleum Technology, Society of Petroleum Engineers of AIME, Jun. 1984, pp. 959-968 (10 pages).

International Search Report and Written Opinion of the International Searching Authority issued in corresponding International Application No. PCT/US2021/054717, dated Feb. 24, 2022 (15 pages).

* cited by examiner

REAL TIME GAS MEASUREMENT SUB

BACKGROUND

While drilling, drilling fluid ("mud") is used to fill a wellbore as a wellbore fluid. Some muds are petroleum based materials and some are water based materials. Petroleum based materials may have at least 90 weight percent of an oil based mud (OBM). Examples of suitable base materials OMBs include crude oils, distilled fractions of crude oil, including diesel oil, kerosene and mineral oil, and heavy petroleum refinery liquid residues. Other OBM components can include emulsifiers, wetting agents and other additives which can give desirable physical properties.

While performing drilling operations, wellbore fluid circulates between the surface and the wellbore interior through fluid conduits. Wellbore fluid also circulates into, and out of, oil bearing formations. The introduction of drilling fluid into the wellbore through a first fluid conduit in a drill pipe, at pressure, induces the drilling fluid to flow into the formation. Wellbore fluid is then forced from the formation through a second fluid conduit into the annulus between the drill string and the wellbore casing. The fluid then flows up the annulus, connecting back to the surface. The expected amount of wellbore fluid displaced and returned to the surface through the second fluid conduit is equivalent to the amount introduced into the wellbore through the first fluid conduit during balanced drilling operations.

Well control problems can result in blowouts because of the solubility of certain gases, such as methane, in OBM. This can make it difficult to detect a kick, or a sudden expulsion of gas, from a wellbore at the surface. A large gas influx entering the wellbore may change the mud properties if too much gas dissolves in the mud. The influx of dissolved gas is then circulated up the wellbore in the mud column until the hydrostatic pressure on top of the gas decreases to a certain point, then the gas flashes, or the bubble point is reached, and gas comes out of solution. Detecting the kick by observing the flowline or mud pits can be very difficult until the kick is very close to surface and expands rapidly. Moreover, gas dispersed in the wellbore fluids does not migrate up the wellbore independent and, therefore, a flow check may not indicate the pressure of a large amount of dissolved gas.

SUMMARY

Embodiments herein are directed toward a system for detection of real time gas expansion within a wellbore using an oil based mud. The system includes one or more ball valve cartridges located in a drill string, where the one or more ball valves are arranged serially along a length in the drill string. Each of the one or more ball valve cartridges include a corresponding gas detection electrode. The system also includes a control system for receiving an output signal from the gas detection electrode. Each of the one or more ball valve cartridges is configured to have a higher pressure rating than a preceding ball valve cartridge, and the gas detection electrode is configured to react with a dissolved gas in the oil based mud, causing an oxidation reaction, and thereby generating the output signal.

In another aspect, embodiments disclosed herein relate to a method for detection of real time gas expansion within a wellbore using an oil based mud. The method including flowing the oil based mud into a drill string as a drilling fluid, circulating the drilling fluid in a wellbore through a first fluid passage, flowing the drilling fluid from the wellbore into an annular space between the drill string and a wellbore wall through a second fluid passage, contacting the drilling fluid in the annular space with one or more gas detection electrodes, detecting a dissolved gas in the drilling fluid using the one or more gas detection electrodes, producing a signal in response to detecting the dissolved gas, and sending the signal from the one or more gas detection electrodes to a surface control system.

Other aspects and advantages will be apparent from the following description and the appended claims.

DETAILED DESCRIPTION

Figure 1:
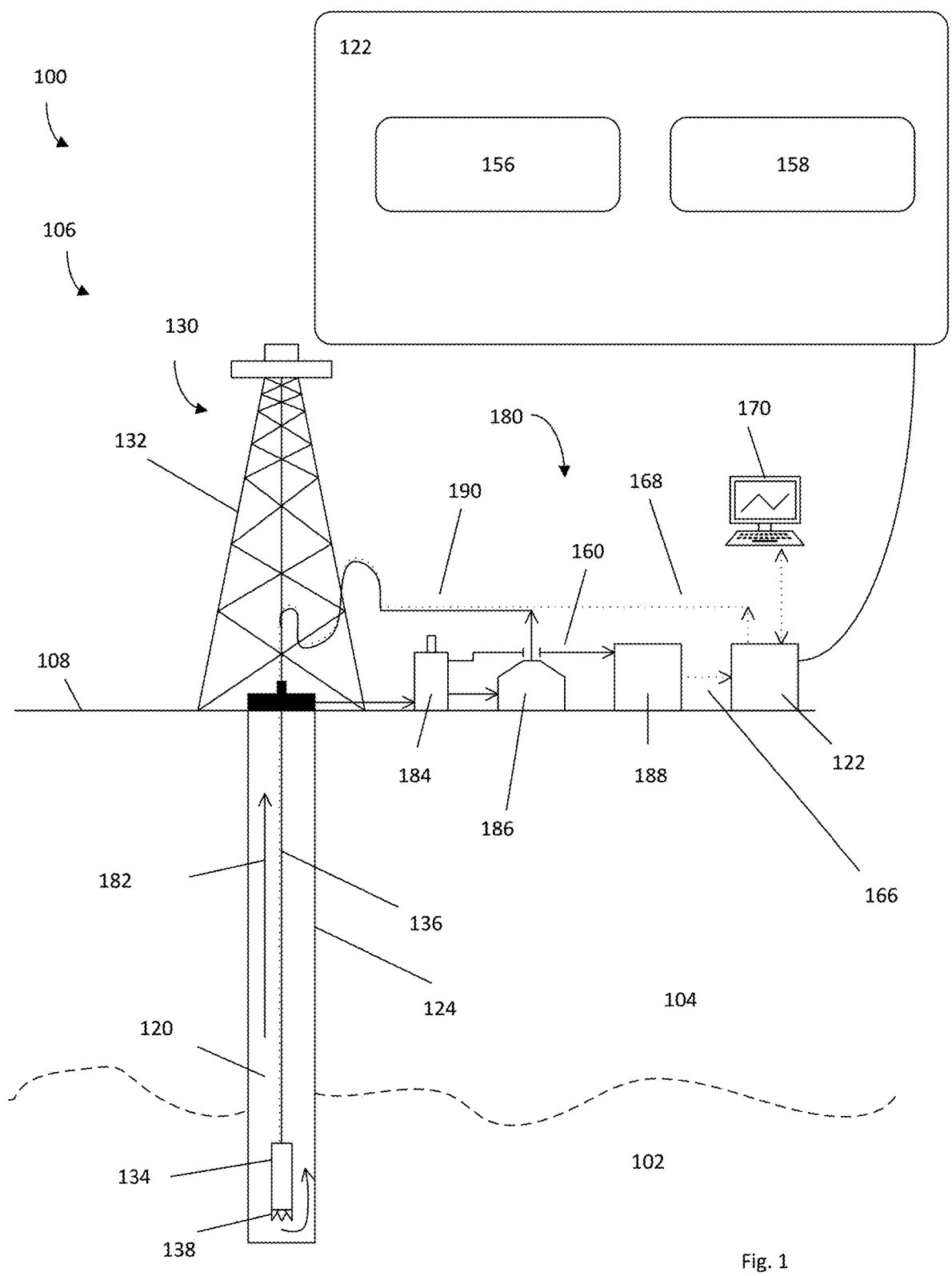
FIG. 1 is a diagram that illustrates a well environment.

The idea of detecting gas presence during the drilling process has been urged by the fact that upon the use of oil based mud compositions, there is a near complete dampening of the presence of gas until the gas reaches the surface. This is primarily due to high gas solubility as a result of the pressure and temperature downhole. Due to the high gas solubility, the gas entering the wellbore during a kick dissolves in an oil based mud almost completely, causing the surface responses associated with the kick to be initially dampened well below kicks normally seen with water based muds.

Accordingly, there exists a real interest in developing real time highly efficient early detection systems of oil based discrete mixtures of mud and gas in the oil based mixtures so as to prevent blowouts and uncontrolled gas releases at the surface. Pit gain monitoring is commonly used as one of the highly reliable indicators of the presence of gas in such mixtures. However, in order to adequately protect a well from a kick or blowout, the detection needs to be early enough to allow the proper well control procedures to be implemented in order to reduce the risk of damage to the environment, equipment, and personnel due to a blowout. Pit gain monitoring does not allow for such early detection due to the lagging nature of the method.

Thus, according to one or more embodiments disclosed herein are methods and systems of detecting gas presence in deep well drillings during oil based mud (OBM) usage. The methods and systems may be a viable alternative and an innovative way of detecting the presence of formation gases at or near the bottom of a wellbore before the gases start to rise along the wellbore to the surface. The system may be designed in order to provide a preemptive detection method that would help avoid gas migration or expansion which leads to blowouts on the drilling platforms, and may provide continuous real time mud gas monitoring during OBM usage.

The methods and systems disclosed herein may be engineered and designed to attach to the drill string bottom hole assembly (BHA). The system may have gas detecting electrodes in one or more segments which are designed to detect changes in pH and OBM acidity. The electrodes may then send real time feedback signals to a surface well control system. Such a system may be able to prevent a blowout event. The systems disclosed herein may function as an early alarm system that triggers a series of testing and analysis procedures to fully analyze the composition of the drilling fluids and gas contamination.

The systems disclosed herein may be suitable for the following compositions and environments. The operating temperature may be from −5 to 200° C. The OBM may have a mud weight of 500-3000 g/l, and oil/water ratio of 0-1, a viscosity of 10-500000 cp as measure by FANN 35 at 3, 6, 30, 60, 100, 200, 300 and 600 rpm, and a pH of 0-14. Further, the OMB may have a hardness of 5 pS/cm to 2000 mS/cm, and a solids and liquids breakdown 0-100%. Additionally, the particle size of the and component may be 0.7 micron-4.8 mm.

The methods and systems, according to one or more embodiments disclosed herein, are based on the real time feedback of collected data from one or more sensors that are interfaced to the well control system. The systems may include a drop ball mechanism where a ball is dropped from a surface of the rig through preset wireless channels until it reaches to the bottom of the sub segment and slot into a seat in a ball valve cartridge, the ball valve cartridge having a gas detecting electrode disposed therein. Multiple ball valve cartridges may be attached to the drill string and located in the BHA. Once seated, the ball valve can operate mechanically by building up the pressure upstream of the ball valve until a preset pressure is reached. Once the pressure reaches the threshold in which the ball will lift from the seat, the OBM and any dissolved gas may come into contact with the gas detecting electrode in the ball valve cartridge. The dissolved gas may then chemically react with the electrode, producing a signal which is sent back to the well control system. The signal may indicate the presence of an amount of dissolved gas within the OBM which may cause a kick or blowout if the gas were to be allowed to travel all the way to the surface. Accordingly, the system may allow for early action for the prevention of a blowout based on the detection of dissolved gas.

The real time interface may include a display visualizing the measured properties such as pH and the oxidization level, thereby indicating the potential presence of gas in the OBM. The interface may also indicate the pressure at which the ball valve associate with the individual electrodes was actuated. The system may also compare the pH and oxidization levels as reported by the electrode to a standard reference pH and oxidization level of the OBM. The standard reference pH and oxidization level may be measured in real time before the OBM is injected into the wellbore, or measured periodically from the OBM storage pit.

FIG. 1 is a diagram that illustrates a well environment in accordance with one or more embodiments. In the illustrated embodiment, the well environment 100 includes a hydrocarbon-bearing formation 102 located in a subsurface formation ("formation") 104 and a well system 106.

The formation 104 may include a porous or fractured rock formation that resides underground, beneath the surface 108 of the Earth. The surface 108 may be dry land or ocean bottom. The well system 106 may be for a hydrocarbon well, such as an oil well, a gas well, a gas condensate well, or a mixture of hydrocarbon-bearing fluids. The hydrocarbon-bearing formation 102 may be a hydrocarbon reservoir defined by a portion of the formation 104 that contains (or that is at least determined to or expected to contain) a subsurface pool of hydrocarbons, such as oil and gas. The formation 104 and the hydrocarbon-bearing formation 102 may each include different layers of rock having varying characteristics, such as degree of density, permeability, porosity, and fluid saturations. In the case of the well system 106 being operated as a production well, the well system 106 may facilitate the extraction of hydrocarbons (or "production") from the hydrocarbon-bearing formation 102. In the case of the well system 106 being operated as an injection well, the well system 106 may facilitate the injection of substances, such as a gas or water, into the hydrocarbon-bearing formation 102. In the case of the well system 106 being operated as a monitoring well, the well system 106 may facilitate the monitoring of various characteristics of the formation 104 or the hydrocarbon-bearing formation 102, such as reservoir pressure or saturation.

The wellbore 120 may be created, for example, by the drilling system 130 boring through the formation 104. In some embodiments, the drilling system 130 includes a drilling rig 132 and a drill string 134. The drill string 134 may include a drill pipe 136 and a drill bit 138. In some embodiments, the drill bit 138 includes a cutting drill bit having rotating teeth that can bore through the formation 104 to create the wellbore 120. In other embodiments, not illustrated, drill string 134 may terminate in a bottom hole assembly (BHA) used during production or well monitoring operations.

The well system 106 may include a wellbore 120, a well control system (or "control system") 122 and a drilling system 130. The control system 122 may regulate various operations of the well system 106, such as well drilling operations, well completion operations, well production operations, or well or formation monitoring operations. In some embodiments, the control system 122 includes a computer system that is the same as or similar to that of computer system 1000 described with regard to at least FIG. 4.

The wellbore 120 may include a bored hole that extends from the surface 108 into a target zone of the formation 104, such as the hydrocarbon-bearing formation 102. Wellbore 120 is defined by wellbore wall 124. Although shown as a vertical well, wellbore 120 may take a deviated or horizontal configuration, the embodiment methods and systems are adaptable and applicable to all wellbore configuration types.

The wellbore 120 may provide for the circulation of drilling fluids or drilling "mud" 182 during drilling operations using a mud circulation system 180. Drilling mud 182 flows downhole through the drill string 134, out the drill bit 138 (cooling the drill bit 138 at the same time from heat of friction against the face of the wellbore 120, and back uphole through the annulus formed by the drill pipe 136 and the wellbore wall 124, carrying cuttings and other debris from the bottom of the wellbore 120.

In conventional embodiments, mud gas samples are collected from the drilling fluid used during a drilling operation. Upon reaching the surface 108, the drilling mud 182 passes into mud receiving tank 184, where the level of mud and dissolved gas is monitored (this is known as pit gain). In addition, in the mud receiving tank 184 the drilling mud 182 is agitated such that it releases any dissolved gas in the drilling mud 182. These mud gases are passed through to the mud logging system 188 via the gas sample line 160. The now degassed drilling mud 182 is passed to the mud storage tank 186, where it is held until it is pumped back to the drill string 134 via the mud return line 190 and then back downhole to repeat the drilling mud circulation cycle.

In some embodiments, the mud logging system 188 is also configured to provide mud gas data 158 to well control system 122 through mud logging signal line 166. Such mud gas data 158 may include, but is not limited to, the detected concentration of one or more dissolved hydrocarbon gases, pH, oxidization levels, and/or pressure.

In some embodiments, the depths associated with the detected and determined values of the mud gas concentrations (and thus the depths displayed on the mud gas log 156) are correlated based on depths reported at the drill site. As the mud gas is extracted from the drilling mud and is detected and values are determined, the depth, often referred to as "driller" depths, is recorded with these values.

The well control system 122 in some embodiments is configured to relay information, such as mud gas data 158 or a mud gas log 156, to a control terminal 170 for viewing by an external viewer. The information may be numerically or graphically displayed, or both. An external viewer may include a computer monitor, a television, a printer, or any other form of temporal or permanent version of record keeping and displaying that can be visually appreciated.

In some additional embodiments, the well control system 122 may utilize some or all of the mud gas data 158, in addition to a set of predetermined instructions and algorithms retained in the memory of a computer system, to maintain or modify operations of drilling system 130 based upon the detected, determined, or a combination of both, values, as will be described later. Such maintenance or modifying operations as determined may be transmitted downhole from well control system 122 via control signal line 168.

The mud gas data 158 is detected, determined, or both, at the surface, so there is a "lag" in the data versus depth. The lag in data to depth may be in a range of from about 10 minutes to upwards of an hour depending on a variety of drilling and wellbore conditions and factors. In some embodiments, the wellbore control system 188 or human intervention may adjust the correlation of wellbore depth with the mud gas data 158 using such other variables as the mud flow rate uphole, the lag time between mud return and mud gas analysis, and the drill bit 138 penetration rate, to account for the estimated depth of the wellbore when the mud gas was created at the drill bit 138 to form a more "correct" mud gas log 156.

As stated, monitoring the mud and dissolved gas in this fashion results in a lagging indicator of the presence of dissolved gas in the mud, which may lead to blowouts without the early detection system disclosed herein. Even with human intervention, the need still exists for a more automated early detection system which can indicate the presence of high levels of dissolved gas in the OBM before the gas reach the surface.

Supporting equipment for embodiments of the system may include additional standard components or equipment that enables and makes operable the described apparatuses, processes, methods, systems, and compositions of matter. Examples of such standard equipment known to one of ordinary skill in the art includes but are not limited to heat exchanges, pumps, blowers, single and multistage compressors, separation equipment, valves, switches, controllers and pressure-, temperature-, level- and flow-sensing devices.

Figure 2:
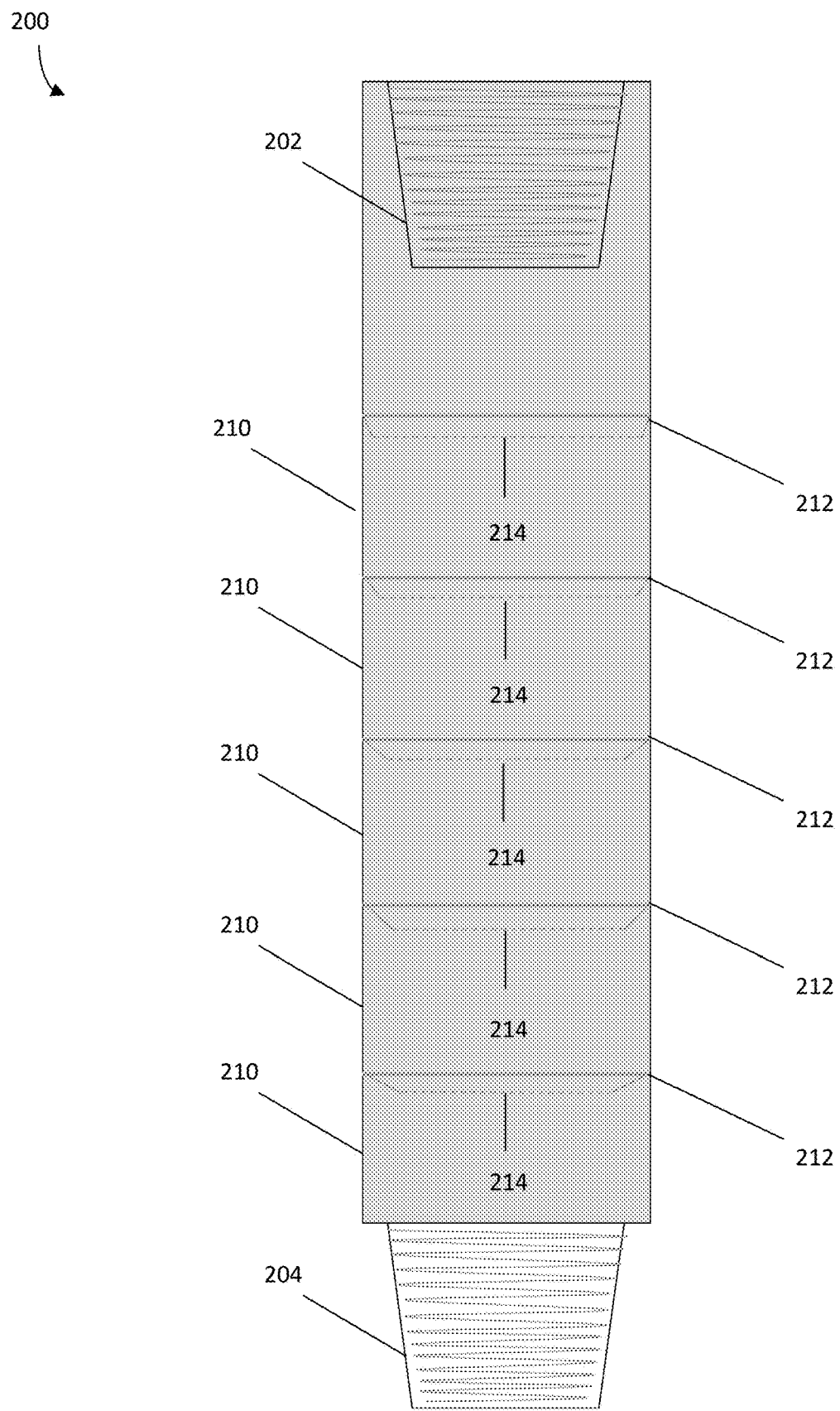
FIG. 2 is an illustration of a drill string sub according to embodiments disclosed herein.

A series of ball valve cartridges for connection with a drill string, according to embodiments disclosed herein, is illustrated in FIG. 2. A sub 200 may be provided with a plurality of ball valve cartridges 210. The sub 200 may also be proved with a box 202 and a pin 204. The plurality of ball valve cartridges 210 may be arranged serially, one after the other, with the box 202 provide at the end closer to the surface and the pin 204 provided at the end closer to the bottom of the wellbore. The box 202 and pin 204, with the planarity of ball valves 210 arranged serially between, are provided such that the sub 200 may be fitted to a drill string (134, FIG. 1) or bottom hole assembly (BHA) by threading the box 202 and pin 204 into corresponding box and pins in sections of drill string. Additionally, each ball valve cartridge is a different size such that ball valve 210 located closest to the pin 204 is smaller than the ball valve 210 axially upstream.

The plurality of ball valve cartridges 210 may each be equipped with a separate gas measurement electrode 212. Each one of these cartridges (or segments) will operate by dropping the proper size of ball to be seated on the ball seat 214 of the segment. As the pressure of the OBM from the formation builds up (for example to 500 psia), the first segment will open via the ball lifting all the ball seat 214, allowing the OBM and any dissolved gas to chemically react with the gas measurement electrode 212. The gas measurement electrode 212 may measure the pH and/or oxidization and send a signal to the control system (122, FIG. 1), where the control system may calculate the percentage of the gas in OBM while the mud is in the annulus of the wellbore. The signal generated may be a certain current or voltage, and may vary based on the reaction (i.e., the higher the pH or oxidation level, the higher the current or voltage). In this way, the control system can measure the percentage of the gas on a real time basis and provide early detection of the gas migration and expansion, maintaining the well control within drilling and tripping time phases.

OBM will have some amount of dissolved gas as a baseline. In order for the control system 122 to determine if the dissolved gas in the OBM are higher after circulating within the formation, a baseline measurement of the OBM acidity (pH and/or oxidation level) may be taken before the mud is injected into the wellbore. The baseline measurement may be taken in real time as the OBM is injected into the wellbore, or may be taken periodically as a batch from the OBM pit. The baseline measurement will correlate to a certain electrode voltage. If the gas measurement electrode 212 sends a voltage signal that is higher than the baseline voltage, the control system 122 will indicate the presence of a higher concentration of dissolved gas in the OBM. In this way, the sub 200 may continuously monitor the changes in OMB pH and/or oxidation as the boring head progresses into the formation. Any changes in the pH and/or oxidation of the fluids at the end of the borehole would indicate the presence of acid gas in the mixture.

In one or more embodiments, more than one sub 200 may be deployed at different depths within the wellbore. Multiple segments and strings may be disposed at different depths in order to gain a more complete picture of the amount, and nature of, dissolved gas within the OBM. Additionally, more subs will allow for the system to operate for a longer period of time, or at a wider pressure range, before the subs need to be returned to the surface for refurbishment, maintenance, or replacement.

While illustrated with five ball valve cartridges 210, the sub 200 may equipped with between 1 and 15 ball valve cartridges depending on the depth, operating pressure, design pressure difference between each cartridge, and other considerations. For example, the first ball valve cartridge may actuate a pressure of 500 psia. The second ball valve cartridge may operate a pressure 5 to 15 psia higher, and likewise for each subsequent cartridge. Additionally, in one or more embodiments, the pressure rating across the sub 200 may not be linear. For example, the first ball valve cartridge may actuate at a pressure of 500 psia, the second at a pressure of 505 psia, and third at a pressure of 520 psia, etc. Since the actuation pressure of each cartridge is known, the corresponding signal sent back to the control system will correspond to both a known depth of the sub 200 as well as the pressure at which the chemical reaction on the corresponding electrode occurred.

In one or more embodiments, the method for detection of real time gas expansion within a wellbore using the above described apparatus may include flowing the OMB into a drill string as a drilling fluid. The OMB may be used power downhole tools, cool the cutting head, and/or clear cuttings. The drilling fluid is then transferred from the wellbore into an annular space between the drill string and the wellbore casing through a second fluid passage. As the drilling fluid travels back up the wellbore, the drilling fluid may contact one or more of the gas detection electrodes, where the gas detection electrodes produce an output signal in response to any detected gas within the OMB. The output signal is sent to a surface control system for analysis.

In response to detected gases in the OBM, the control system may start one or more systems for the control or prevention of a blowout. For example, the control system may reduce the flow of the drilling fluid into the drill string in response to the signal, or may operate one or more blowout prevention systems in response to the signal. In such a way, real time monitoring of dissolved gas in OBM, and an advanced warning system for a possible blowout may be achieved.

Figure 3:
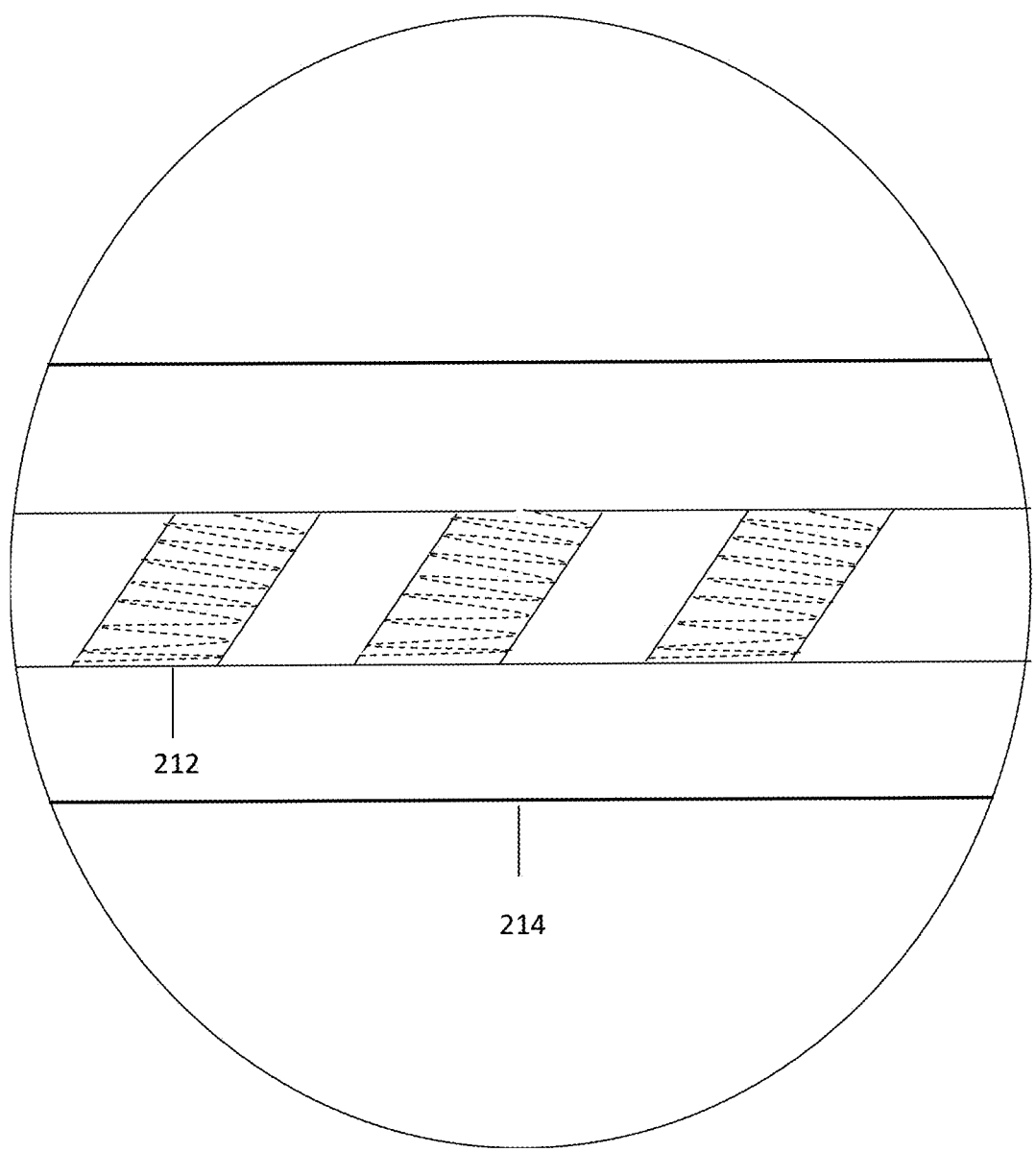
FIG. 3 is an illustration of a gas detecting electrode according to embodiments disclosed herein.

FIG. 3 is an expanded view of the gas detection electrode section of the ball valve cartridges 210 of the sub 200. In this view, the ball valve cartridge is in the "open" position with the ball not in the ball seat. As the ball (not illustrated) comes off the ball seat 214, OBM, with any dissolved gas, may be allowed to come into contact with the gas measurement electrode 212. In one or more embodiments, multiple gas measurement electrodes 212 may be located in each ball valve cartridge, and located around the periphery of the ball valve cartridge such that when the ball is seat in the ball 214, the gas measurement electrode(s) 212 are shielded from contact with the OBM. When the pressure builds up and the ball valve opens, the OBM will contact the gas measurement electrode(s) 212. A chemical reaction will be caused by the oxidization process, thereby generating a voltage spike through the electrode which will then be transmitted to the signal processor that is part of the control system.

Electrodes useful in one or more embodiments disclosed herein may be based an off-the shelf technology that is already suitable for detection of acid gas in OBM, similar to those used in pit gain measurement and analysis systems. In other embodiments, the electrodes may have adjustments or alterations that will make the electrode suitable for the high temperature, high pressure environments in wellbores and formations. As an example, conventional microchips may not be able to handle the temperature and pressure in the wellbore and a customized electrode microchip design may be required for optimization the operation in order to obtain the accuracy desired. In some embodiments, the microchips may be one-time use integrated microcircuits that will be replaced each time the sub is fully depleted (i.e., each ball valve opens and the OBM contacts the corresponding electrode(s)) or once the sub is retrieved at the surface of the drilling station. In other embodiments, the microchips may be designed to be reusable several times before needing to be replaced. In yet other embodiments, the gas detecting electrode may be designed or selected based on known properties of the formation in which the electrodes are to be used.

The output signal generated by the gas measurement electrode(s) may be a current, measured by amps or milliamps. This signal must be converted to a voltage so that the signal can be properly filtered and treated before being send to the control system. This conversion is performed using a current to voltage converter that has a single electrical supply. The generated voltage is then amplified and filtered to remove noise through other integrated circuits, and then sent to the interpretation software component which analyzes and interprets the parameter values. The interpretation software component then sends the values to the control system for metered reading and accurate display on the monitor or control panel.

Once the circuitry sends the voltage signal the control system, one or more computer systems may interpret the voltage and send the data to a real time interface for a mud engineer. The interface may include a display which can visualize the measured properties, such as pH and the oxidization level, indicating a potential presence of gas in the oil based mud composition.

The control system may further include an analysis algorithm for using real time data and comparing that data with the standard reference pH or oxidization level of the OBM prior to injection. By using this analysis and comparison, a real time level of gas dissolution may be determined. If an excess of dissolved gas is determined, the control system can give an early alarm, thereby allowing the control system, or plant operators, to start safety procedures to mitigate, or eliminate, a potential blowout.

Figure 4:
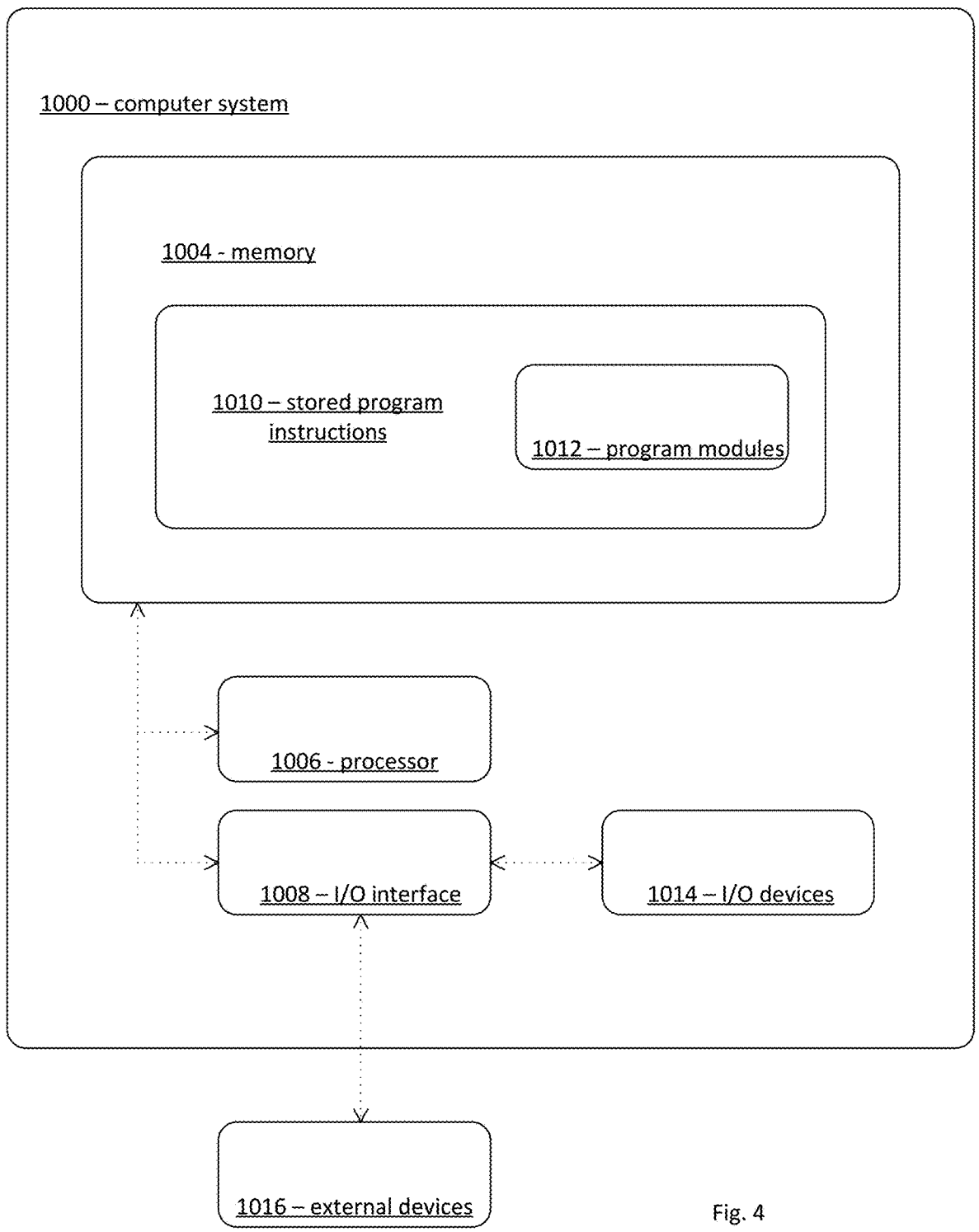
FIG. 4 is diagram that illustrates an example computer system (or "system").

FIG. 4 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (for example, flash memory, read-only memory (ROM), programmable read-only memory (PROM), erasable programmable read-only memory (EPROM), electrically erasable programmable read-only memory (EEPROM)), volatile memory (for example, random access memory (RAM), static random access memory (SRAM), synchronous dynamic RAM (SDRAM)), or bulk storage memory (for example, CD-ROM or DVD-ROM, hard drives). The memory 1004 may include a non-transitory computer-readable storage medium having stored program instructions 1010. The program instructions 1010 may include program modules 1012 that are executable by a computer processor (for example, the processor 1006) to cause the functional operations described, such as those described with regard to the well control system 122 (or another operator of the well system 106) or the method 300.

The processor 1006 may be any suitable processor capable of executing program instructions. The processor 1006 may include a central processing unit (CPU) that carries out program instructions (for example, the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (for example, an electronic display for displaying a graphical user interface (GUI)). The I/O devices 1014 may include one or more of the user input devices. The I/O devices 1014 may be connected to the I/O interface 1008 by way of a wired connection (for example, an Industrial Ethernet connection) or a wireless connection (for example, a Wi-Fi connection). The I/O interface 1008 may provide an interface for communication with one or more external devices 1016. In some embodiments, the I/O interface 1008 includes one or both of an antenna and a transceiver. In some embodiments, the external devices 1016 include the drilling system 130, such as control terminal 170 of FIG. 1.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A system for detection of real time gas expansion within a wellbore using an oil based mud, the system comprising:
    two or more ball valve cartridges located in a drill string, the two or more ball valve cartridges being arranged serially along a length in the drill string,
    each of two one or more ball valve cartridges having a corresponding gas detection electrode;
    a control system for receiving an output signal from the gas detection electrode;
    wherein each of the two or more ball valve cartridges is configured to have a higher pressure rating than a preceding ball valve cartridge, and
    wherein the gas detection electrode is configured to react with a dissolved gas in the oil based mud, causing an oxidation reaction, and thereby generating the output signal.

2. The system of claim 1, further comprising: one or more groups of the two or more ball valve cartridges, the one or more groups located at different depths in the wellbore.

3. The system of claim 1, wherein the two or more ball valve cartridges comprise a first ball valve actuating at a first pressure and a second ball valve actuating a second pressure.

4. The system of claim 3, wherein the second ball valve is located downstream of the first ball valve.

5. The system of claim 3, wherein the second pressure is greater than the first pressure.

6. A method for detection of real time gas expansion within a wellbore using an oil based mud, the method comprising:
    flowing the oil based mud into a drill string as a drilling fluid;
    circulating the drilling fluid in a wellbore through a first fluid passage;
    flowing the drilling fluid from the wellbore into an annular space between the drill string and a wellbore wall through a second fluid passage;
    contacting the drilling fluid in the annular space with one or more gas detection electrodes, wherein the one or more gas detection electrodes comprise a first gas detection electrode and a second gas detection electrode located downstream of the first gas detection electrode;
    activating the first gas detection electrode at a first pressure;
    activating the second gas detection electrode at a second pressure, wherein the second pressure is greater than the first pressure;
    detecting a dissolved gas in the drilling fluid using the one or more gas detection electrodes;
    producing a signal in response to detecting the dissolved gas; and
    sending the signal from the one or more gas detection electrodes to a surface control system.

7. The method of claim 6, wherein the step of detecting further comprises:
    measuring a level of oxidation on the one or more gas detection electrodes; and
    measuring a level of pH of the drilling fluid.

8. The method of claim 6, further comprising reducing the flow of the drilling fluid into the drill string in response to the signal.

9. The method of claim 6, further comprising operating one or more blowout prevention systems in response to the signal.

* * * * *